United States Patent
Lim

(10) Patent No.: US 9,602,826 B2
(45) Date of Patent: Mar. 21, 2017

(54) MANAGING TRANSFORMS FOR COMPRESSING AND DECOMPRESSING VISUAL DATA

(71) Applicant: Massachusetts Institute of Technology, Cambridge, MA (US)

(72) Inventor: Jae S. Lim, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 319 days.

(21) Appl. No.: 14/317,689

(22) Filed: Jun. 27, 2014

(65) Prior Publication Data

US 2015/0381993 A1  Dec. 31, 2015

(51) Int. Cl.
| H04N 19/18 | (2014.01) |
| H04N 19/124 | (2014.01) |
| H04N 19/176 | (2014.01) |
| H04N 19/147 | (2014.01) |
| H04N 19/12 | (2014.01) |
| H04N 19/194 | (2014.01) |

(52) U.S. Cl.
CPC ............ *H04N 19/18* (2014.11); *H04N 19/12* (2014.11); *H04N 19/124* (2014.11); *H04N 19/147* (2014.11); *H04N 19/176* (2014.11); *H04N 19/194* (2014.11)

(58) Field of Classification Search
CPC .... H04N 19/18; H04N 19/124; H04N 19/176; H04N 19/60
See application file for complete search history.

(56) References Cited

U.S. PATENT DOCUMENTS

| 7,894,530 B2 | 2/2011 | Gordon et al. |
| 8,509,309 B2 | 8/2013 | Kamisli et al. |
| 2008/0049854 A1* | 2/2008 | Kim ........... H04N 19/50 375/260 |
| 2011/0286516 A1* | 11/2011 | Lim ........... H04N 7/17318 375/240.03 |
| 2011/0293002 A1 | 12/2011 | Sole et al. |

* cited by examiner

*Primary Examiner* — Dave Czekaj
*Assistant Examiner* — Nam Pham
(74) *Attorney, Agent, or Firm* — Occhiuti & Rohlicek LLP

(57) ABSTRACT

Encoding data includes: encoding a first portion of an array of data to generate a first set of coefficients, using a first transform; decoding the first set of coefficients to generate a decoded approximation of the first portion, using the first transform; selecting a second transform from multiple candidate transforms based at least in part on a measure of encoding performance for each candidate transform used to encode the decoded approximation of the first portion; and encoding a second portion of the array of data in proximity to the first portion of the array of data to generate a second set of coefficients using the selected second transform.

23 Claims, 6 Drawing Sheets

MANAGING TRANSFORMS FOR COMPRESSING AND DECOMPRESSING VISUAL DATA

BACKGROUND

This description relates to managing transforms for compressing and decompressing visual data.

Compression of visual data is important because raw visual data such as images and video typically require a large number of bits for their representation. Compression allows for storage and transmission of visual data using a smaller number of bits. One aspect of compression relates to compressing the visual data itself using various techniques. Some compression is achieved by removing redundancy, for example, by generating prediction residuals representing a difference between a predicted frame and the actual frame. Various compression steps are also typically applied to results of transforms applied to portions of the visual data (e.g., a block of data from a video frame or from a prediction residual frame). The compression may include some lossy compression steps and some lossless compression steps. For example, lossy compression steps include quantization of transform coefficients, and lossless compression steps include Huffman coding and run-length coding of quantized coefficients. In some systems, another aspect of compression relates to compressing the side information that is sent along with the compressed visual data, such as information identifying which of multiple potential transforms were used to encode the visual data. For example, some systems use entropy coding to efficiently encode the bits representing the selected transform.

SUMMARY

In one aspect, in general, a method of encoding data includes: encoding a first portion of an array of data to generate a first set of coefficients, using a first transform; decoding the first set of coefficients to generate a decoded approximation of the first portion, using the first transform; selecting a second transform from multiple candidate transforms based at least in part on a measure of encoding performance for each candidate transform used to encode the decoded approximation of the first portion; and encoding a second portion of the array of data in proximity to the first portion of the array of data to generate a second set of coefficients using the selected second transform.

Aspects can include one or more of the following features.

The selection of the second transform is independent of a selection of the first transform used for encoding the first portion.

Encoding the first portion includes applying at least one lossy operation to generate the first set of coefficients.

The lossy operation comprises quantization of transform coefficients resulting from the first transform to generate the first set of transform coefficients.

Decoding the first set of coefficients includes applying at least one approximate inverse of the lossy operation to generate the decoded approximation of the first portion.

The approximate inverse operation comprises inverse quantization of the first set of transform coefficients.

A first candidate transform used to encode the decoded approximation of the first portion results in a second set of coefficients, and the measure of encoding performance comprises a difference between the decoded approximation of the first portion and data decoded from the second set of coefficients using the first candidate transform.

The first portion of the array of data comprises a residual block obtained by subtracting a block of pixel values of a first video frame from a corresponding block of pixel values of a second video frame.

The method further includes transmitting encoded data including the encoded first portion of the array, the encoded second portion of the array, and side information identifying the first transform used for encoding the first portion of the array.

The side information does not include any information explicitly identifying the second transform used for encoding the second portion of the array.

In another aspect, in general, a computer-readable medium stores a computer program for encoding data. The computer program comprises instructions for causing a computer system to: encode a first portion of an array of data to generate a first set of coefficients, using a first transform; decode the first set of coefficients to generate a decoded approximation of the first portion, using the first transform; select a second transform from multiple candidate transforms based at least in part on a measure of encoding performance for each candidate transform used to encode the decoded approximation of the first portion; and encode a second portion of the array of data in proximity to the first portion of the array of data to generate a second set of coefficients using the selected second transform.

In another aspect, in general, an apparatus for encoding data includes: transmitting circuitry configured to transmit data including coefficients representing portions of an array of data, and at least one processor coupled to the transmitting circuitry. The processor is configured to: encode a first portion of the array of data to generate a first set of coefficients, using a first transform; decode the first set of coefficients to generate a decoded approximation of the first portion, using the first transform; select a second transform from multiple candidate transforms based at least in part on a measure of encoding performance for each candidate transform used to encode the decoded approximation of the first portion; and encode a second portion of the array of data in proximity to the first portion of the array of data to generate a second set of coefficients using the selected second transform.

In another aspect, in general, a method of decoding data includes: receiving data including coefficients representing portions of an array of data; decoding a first set of coefficients to generate a decoded approximation of a first portion of the array of data, using a first transform; selecting a second transform from multiple candidate transforms based at least in part on a measure of encoding performance for each candidate transform used to encode the decoded approximation of the first portion; and decoding a second set of coefficients to generate a decoded approximation of a second portion of the array of data in proximity to the first portion of the array of data, using the selected second transform.

Aspects can include one or more of the following features.

The selection of the second transform is independent of a selection of the first transform used for encoding the first portion.

Encoding the first portion included applying at least one lossy operation to generate the first set of coefficients.

The lossy operation comprised quantization of transform coefficients resulting from the first transform to generate the first set of transform coefficients.

Decoding the first set of coefficients includes applying at least one approximate inverse of a lossy operation to generate the decoded approximation of the first portion.

The approximate inverse operation comprises inverse quantization of the first set of transform coefficients.

A first candidate transform used to encode the decoded approximation of the first portion results in a second set of coefficients, and the measure of encoding performance comprises a difference between the decoded approximation of the first portion and data decoded from the second set of coefficients using the first candidate transform.

The first portion of the array of data comprises a residual block obtained by subtracting a block of pixel values of a first video frame from a corresponding block of pixel values of a second video frame.

The method further includes receiving encoded data including the first set of coefficients, the second set of coefficients, and side information identifying the first transform used for encoding the first portion of the array.

The side information does not include any information explicitly identifying the second transform used for decoding the second set of coefficients.

In another aspect, in general, a computer-readable medium stores a computer program for decoding data. The computer program comprises instructions for causing a computer system to: receive data including coefficients representing portions of an array of data; decode a first set of coefficients to generate a decoded approximation of a first portion of the array of data, using a first transform; select a second transform from multiple candidate transforms based at least in part on a measure of encoding performance for each candidate transform used to encode the decoded approximation of the first portion; and decode a second set of coefficients to generate a decoded approximation of a second portion of the array of data in proximity to the first portion of the array of data, using the selected second transform.

In another aspect, in general, an apparatus for decoding data includes: receiving circuitry configured to receive data including coefficients representing portions of an array of data; and at least one processor coupled to the receiving circuitry. The processor is configured to: decode a first set of coefficients to generate a decoded approximation of a first portion of the array of data, using a first transform; select a second transform from multiple candidate transforms based at least in part on a measure of encoding performance for each candidate transform used to encode the decoded approximation of the first portion; and decode a second set of coefficients to generate a decoded approximation of a second portion of the array of data in proximity to the first portion of the array of data, using the selected second transform.

In another aspect, in general, a system includes: at least one transmitting device configured to: encode a first portion of an array of data to generate a first set of coefficients using a first transform; decode the first set of coefficients to generate a decoded approximation of the first portion, using the first transform; selecting a second transform from multiple candidate transforms based at least in part on a measure of encoding performance for each candidate transform used to encode the decoded approximation of the first portion; and encoding a second portion of the array of data in proximity to the first portion of the array of data to generate a second set of coefficients using the selected second transform. The system also includes at least one receiving device configured to: receive data including coefficients representing portions of the array of data, the received data including the first set and second sets of coefficients generated by the transmitting device; decode the first set of coefficients to generate the decoded approximation of the first portion, using a first transform; select the second transform from the multiple candidate transforms based at least in part on a measure of encoding performance for each candidate transform used to encode the decoded approximation of the first portion; and decode the second set of coefficients to generate the decoded approximation of the second portion, using the selected second transform.

Among the many advantages of the invention (some of which may be achieved only in some of its various aspects and implementations) are the following.

Some video or image compression techniques use only a single type of transform on all blocks of data to be transformed. Other techniques have a group of multiple different candidate transforms that could be used, and one transform is selected from the group for use on a particular block. Such multiple-transform techniques enable different blocks to be transformed using different transforms that may be more efficient for those particular blocks. For a decoder to be able to decode the encoded transform coefficients and generate a decoded approximation of the original block, the decoder needs to determine which transform was used for that block. Some techniques send information explicitly identifying which transform was used on a block in side information sent along with the encoded visual data. However, this side information can represent a considerable cost to overall bit rate needed to transmit the encoded visual data over a network, particularly when the number of candidate transforms is large.

In some techniques for reducing the size of side information that is transmitted along with the encoded visual data, the explicit indication of which transform was selected is not sent for every block. Instead, for certain blocks, the transform to be used is selected using a selection procedure that compares the performance of different transforms on neighboring blocks. This selection procedure is performed at the encoder and decoder using the same comparison steps on the same reconstructed approximation of the neighboring blocks to yield the same selected transform. The selection procedure is based on the idea that there is generally a significant correlation between blocks in proximity to each other, such that a transform that performs well for one block is likely to also perform well for another block in proximity to that block (e.g., an immediate neighbor of that block). Since the information used to select the transform to be used for a particular block is available at both the encoder and decoder, no information explicitly identifying the transform needs to be transmitted as side information. There may be one or more initial blocks in a group of blocks (e.g., in a prediction residual) whose transform is explicitly identified by transmitted side information. But, the amount of side information is still potentially greatly reduced by removing this requirement from every block in the group.

Additionally, a technique is used to ensure that sub-optimal transform choices for some blocks are not propagated to neighboring blocks. For example, some techniques for deducing a transform from information available at both the encoder and decoder may simply allow the decoder to infer the selected transform by requiring selection of the same transform that was selected for transforming a neighboring block. Instead, a technique is described herein for replicating a transform selection procedure that is independent from the selection of a transform for transforming a neighboring block. This procedure, described in more detail below, is based on performance analysis on a decoded approximation of a neighboring block regardless of which transform was used to generate that approximation. Thus, sub-optimal choice for transforming one block does not necessarily propagate to its neighboring blocks.

Other features and advantages of the invention will become apparent from the following description, and from the claims.

DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
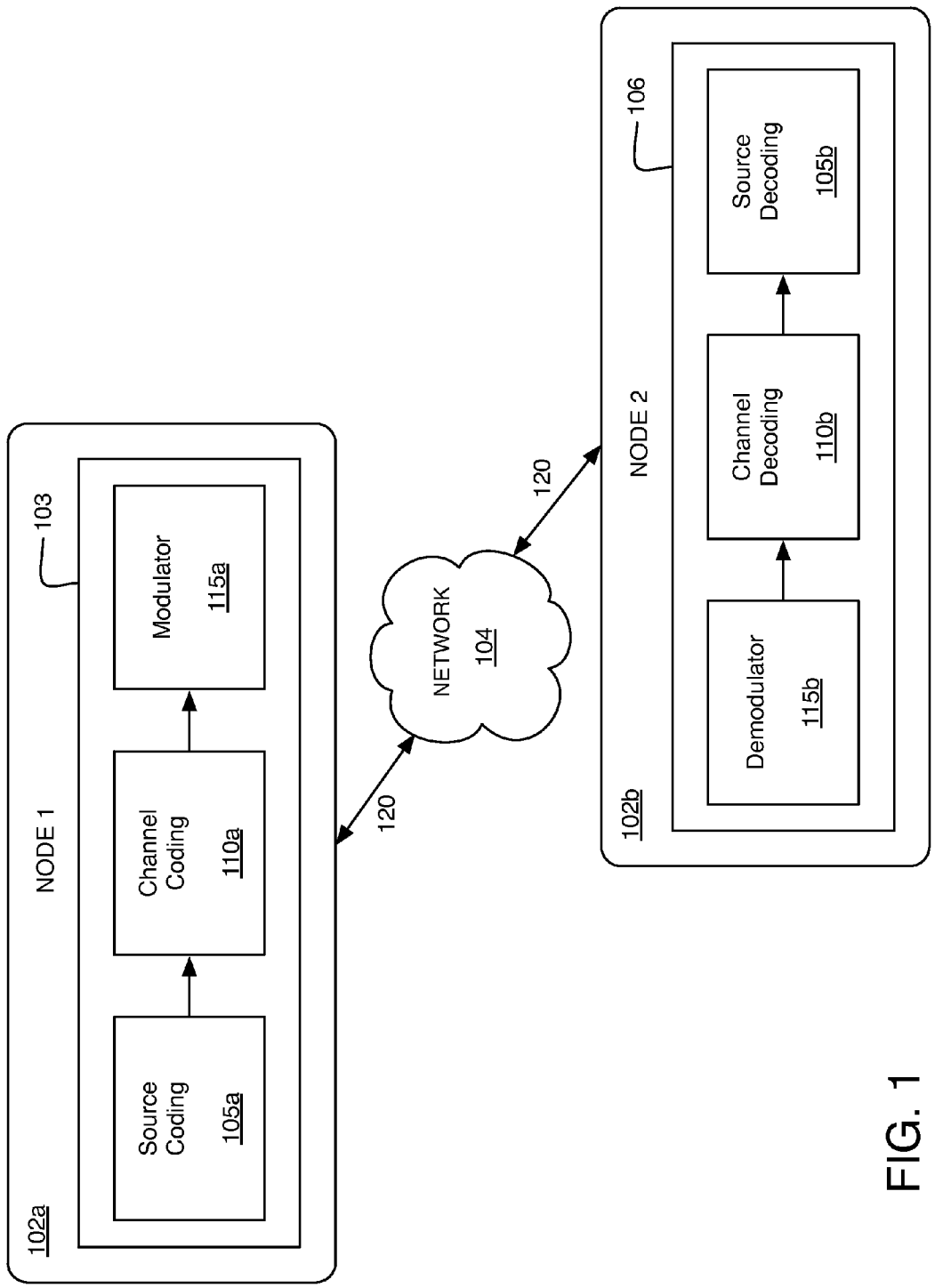
FIG. 1 is a block diagram of an exemplary communication system.

FIG. 1 shows an exemplary system 100 for communicating data over a network. The system 100 includes two nodes 102a and 102b (102 in general) connected over a network 104. In this example, the node 102a transmits information to the node 102b, but in general, the nodes 102 may transmit and/or receive information to or from each other or to or from other nodes in the network 104. In some implementations, the information includes visual data such as images or video. In some implementations, a node 102a (node 1 in FIG. 1) includes a transmitter 103. The transmitter 103 may be configured to encode data from a source that is part of, or connected to, the node 102a, and transmit encoded data over the network 104. In some implementations, the transmitter 103 may include components for source coding 105a and channel coding 110a. The transmitter 103 may also include a modulator 115a. The transmitter may also include one or more components or devices for converting data from the source into a format suitable for source coding. In some implementations, the transmitter 103 may optionally store and retrieve encoded visual data between the source coding 105a and the channel coding 110a, and/or the node 102a may comprise multiple devices such as a device with the source coding 105a, and a separate device with the channel coding 110a and modulator 115a.

Source coding 105a may also be referred to as a data compression technique. Source coding may involve encoding schemes engineered to reduce the number of bits required for representing a given image, video, or other type of information. Source coding 105a may include lossy compression techniques. In some implementations, especially when transmissions over a network are involved, lossy compression techniques are preferred since it reduces bandwidth required to transmit information. Examples of compression techniques used in source coding 105a may include transform coding involving mathematical transforms such as discrete cosine transform (DCT), discrete sine transform (DST), discrete wavelet transform (DWT), fractal compression, and discrete Fourier transform (DFT). The resulting transform coefficients, representing quantities in a spatial frequency domain, are typically quantized to reduce the amount of information to be coded, which also introduces loss since the quantization cannot be perfectly reversed. The quantized transform coefficients may then be further encoded using lossless compression techniques.

When a transform is selected from a group of multiple candidate transforms, source coding 105a may include a selection procedure for comparing performance of different transforms on one or more decoded local reference blocks, as described in more detail below. In some implementations, source coding 105a may be in accordance with one or more standards. Such standards may include video standards such as MPEG-2, MPEG-4, H.263 and H.264. Such standards may also include image compression standards such as JPEG.

Channel coding 110a can include the addition of redundant bits in information to be transmitted across a channel. Thus, channel coding is also considered to be lossless. Channel coding may facilitate error detection and/or error correction at a receiver end and increases the reliability of a transmission. Channel codes that add redundant bits may also be referred to as error correction codes. Channel coding 110a may include the use of codes such as block codes, convolutional codes, turbo codes and low density parity check (LDPC) codes.

The transmitter may include a modulator 115a. The modulator 115a modulates an analog carrier in accordance with a stream of digital bits representing the encoded visual data. The modulator may use any digital modulation techniques including, for example, phase shift keying (PSK), frequency shift keying (FSK), amplitude shift keying (ASK), quadrature amplitude modulation (QAM), pulse position modulation (PPM), on-off keying (OOK), minimum shift keying (MSK), continuous phase modulation (CPM), Trellis coded modulation (TCM), and orthogonal frequency division multiplexing (OFDM).

In some implementations, a node 102b (node 2 in FIG. 1) includes a receiver 106 that is configured to receive information from another node 102 on the network. Even though FIG. 1 shows the transmitter 103 and receiver 106 to be on different nodes, it should be appreciated that any node 102 may have one or more transmitters and/or one or more receivers. Also, the transmitter 103 and/or the receiver 106 may be a part of any node 102. The receiver 106 typically includes a demodulator 115b, and components for channel decoding 110b, and source decoding 105b. The demodulator 115b typically does an inverse operation to that of the modulator 115a to recover digital bits from a received modulated analog signal. Similarly, the channel decoding 110b and source decoding 105b typically perform inverse operations to that performed by the channel coding 110a and source coding 105a, respectively. However, when lossy compression techniques are included, the source decoding 105b is generally not able to perform a perfect inverse of every operation of the source coding 105a (e.g., inverse quantization, if performed, cannot perfectly restore the original transform coefficients). As part of performing the source decoding 105b, when decoding a particular block, the node 102b may use an equivalent selection procedure to that used by the source encoding 105a for comparing performance of different transforms on one or more decoded local reference blocks. This avoids the need to transmit information explicitly indicating which transform was used for that particular block along with the encoded data sent over the network 104, as described in more detail below. In some implementations, the receiver 106 may be connected to a display for rendering the received video or image data. Any software and additional hardware may be used for such rendering. The receiver 106 may be connected to a storage medium to store the received digital data.

The nodes 102 may be connected via the network 104. Although FIG. 1 shows only one network 104 connecting the nodes, there may be multiple such networks interconnected with each other. The networks can be the same type of network or different types of networks. The network 104 can include a local-area network (LAN), such as a company Intranet, a metropolitan area network (MAN), or a wide area network (WAN), such as the Internet or the World Wide Web. In one implementation, the network 104 may include one or more of a private network and a public network.

The network 104 supports one or more channels between nodes connected to the network. For example the nodes 102a and 102b may be connected by a channel 120. In some implementations, the channel 120 may include different sections over different media. The channel sections may have substantially the same or different channel characteristics. In some implementations, some of the channel characteristics of the channel sections may be the same while some other channel characteristics may be different. In general, a channel may be defined as properties of at least a part of a medium over which two nodes communicate with each other.

Figure 2:
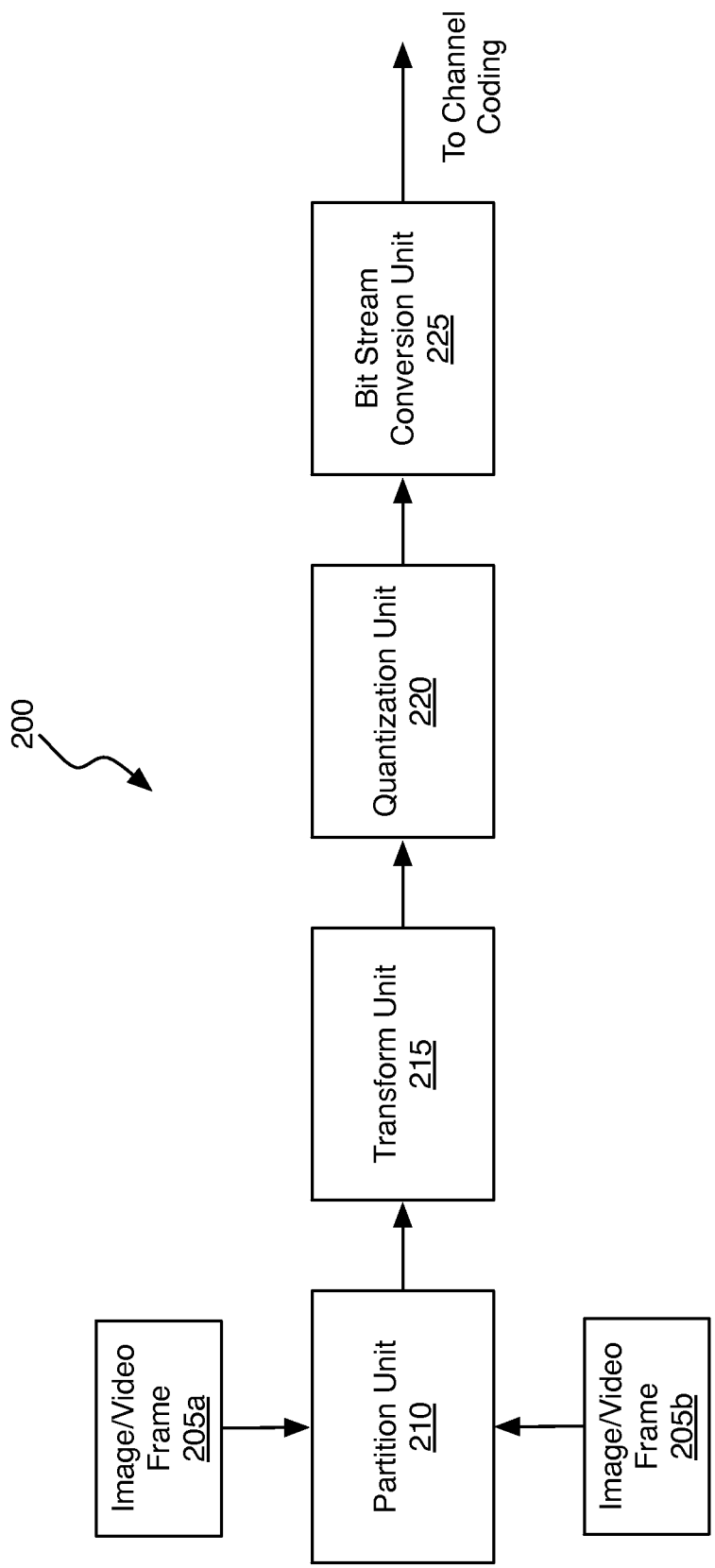
FIG. 2 is a block diagram of an exemplary source coding system.

Referring now to FIG. 2, a block diagram of an exemplary encoder 200 for implementing the source coding 105a is shown and described. The encoder 200 includes a partition unit 210 that partitions or divides a data array (e.g., a video frame, or residual frame, as described in more detail below) into multiple subparts, which are themselves arrays of data called blocks. In some implementations, the blocks are square arrays of pixels, where each pixel value can be encoded in any of a variety of formats. The encoder 200 also includes a transform unit 215 that transforms data from one domain into another. The encoder 200 includes a quantization unit 220 that converts transform coefficients into quantized numbers. The encoder 200 includes a bit stream conversion unit 225 that converts the quantized numbers to streams of bits.

The data array (205 in general) may be of different types and forms. In some cases, the data array 205 is an image/video frame 205a (e.g., either an individual image or an image that is a video frame). In some cases, the data array 205 is a prediction residual 205b related to a video frame. For example, a prediction residual 205b may be a difference between the current frame and a predicted current frame obtained using operations such as linear prediction, non-linear prediction, and/or interpolation, and may involve estimating and using motion vectors. In some cases, a data array 205 includes some portions that encode portions of a video frame image directly and other portions that encode prediction residuals for portions of the video frame image. In such cases, whether a portion of the video frame image is encoded directly or as a prediction residual can be determined based on which can be more efficiently compressed by the transform unit 215. The data arrays 205 in the following examples are two-dimensional arrays. Alternatively, similar techniques can be applied to arrays of different dimensions.

The data array 205 is partitioned into subparts via the partition unit 210. The partition unit 210 may partition a data array 205 in a variety of ways. For example, the partition unit may divide a data array 205 into multiple two-dimensional arrays. In some implementations, where the data array 205 has a dimension of three or higher, the partition unit 210 may divide the data array 205 into multiple partitions having lower dimensions. The partition unit 210 may divide the data in a homogenous or non-homogenous fashion. For example, part of a two-dimensional array 205 (such as an image 205a or a video or residual frame 205b) may be partitioned into smaller two-dimensional blocks whereas another part of the two-dimensional array 205 may be partitioned into larger two-dimensional blocks. In some implementations, the partition unit may introduce one or more identifying parameters corresponding to each partition such that the original data array may be reconstructed from the partitions. In some implementations, the partition unit 210 may pass on the data array 205 without dividing it into any subparts. Whether or not the partition unit 210 divides the data array into subparts, may be governed by one or more parameters or a nature of the data array.

The transform unit 215 transforms an array (e.g., a partitioned block or an entire data array 205) from one domain to another. For example, the transform unit 215 transforms data from a spatial domain to a frequency domain. Transforms computed by the transform unit 215 may include, for example, one or more of discrete cosine transform (DCT), discrete sine transform (DST), discrete wavelet transform (DWT), fractal compression, and discrete Fourier transform (DFT). In some implementations, the transform unit 215 selects the transform to be applied form a group of multiple candidate transforms. The candidate transforms can differ in any of a variety of respects. For example, some candidate transforms can be of a different type (i.e., DCT vs. DWT), or some candidate transforms can be of the same type but have different parameters causing different coefficients to be generated from the same input array. This selection procedure is described in more detail below with reference to FIGS. 3A-3B and 4A-4B, which illustrate an example of one possible implementation of this selection procedure. Typically, the transform unit 215 facilitates representation of the array using the same number of coefficients as there are pixels in the received array. The transform unit 215 may compute any combination of one-dimensional, two-dimensional, or higher-dimensional transform.

The transform unit 215 may be used to transform different types of data arrays. In some implementations, such as in image compression, the pixels representing image intensities are transformed. In other implementations, such as in video compression, pixels representing prediction residuals may be transformed. Examples of prediction residuals include the motion-compensation-residual (MC-residual), the resolution-enhancement-residual (RE-residual) which is often used in scalable video coding, the disparity-compensation-residual (DC-residual) often used in multiview coding, and intra prediction residual often used in H.264/AVC. Typically, transforms used to compress images may also be used to compress prediction residuals. For example, the Discrete Cosine Transform (DCT) may be used to compress images and MC-residuals. Another example of such transforms is the Discrete Wavelet Transform (DWT), which may be used to compress images as well as residual frames.

The transform unit 215 may further include hardware or software to select or discard one or more of the computed transform coefficients. For example, the transform unit may select only non-zero coefficients of a computed transform for further processing. In some implementations, coefficients of a computed transform may be selected based on a threshold, such that coefficients below the threshold are not selected. Coefficients may also be selected based on one or more of a value of the coefficient, a location of the coefficient in the computed transform array, information content of the coefficient, and other application or user specific criteria. In some implementations, the transform unit may pass an incoming signal without transformation. For example, if the transform unit 215 includes a digital filter with a delta function impulse response, the incoming signals will be passed through the unit 215 substantially unchanged. The transform unit 215 can be configured to apply a transform or pass a signal without transformation selectively for a given block.

The quantization unit 220 is used to represent a range of values using a single representative value. For example, values of transform coefficients may be of continuous nature and the quantization unit 220 may represent such coefficients using a limited number of discrete values. The quantization unit 220 may perform operations such as round, ceiling, floor, modulo and threshold. The quantization unit 220 may represent the transform coefficients in a variety of ways. For example, in some implementations, the quantization unit 220 represents a transform coefficient as the next highest or lowest integer. In other implementations, the quantization unit 220 may represent a coefficient up to two decimal places. The quantization unit 220 may use different methods to quantize different coefficients. For example, consider a one-dimensional array of coefficients: [58 −51 −15 −12]. A corresponding quantization array may be defined as: [24 40 51 61], for which the quantized values will be: [2 −1 0 0], the operation being dividing each element of the coefficient array by the corresponding value in the quantization array and then rounding to the nearest integer. In other implementations, a homogenous quantization may also be used where each coefficient is quantized in substantially the same way.

The bit stream conversion unit 225 converts numbers to streams of bits. The bits can be computed by reading the numbers representing the quantized coefficients according to a particular scanning order (e.g., a zig-zag scanning order). The numbers will be encoded to a binary representation using any of a variety of compression techniques (e.g., run-length coding, entropy coding). The compression techniques used in the bit stream conversion unit 225 may be lossless techniques. Bits may be physically represented in various ways such as different levels of voltage, current, or a presence or absence of a signal. The bit streams coming out of the bit stream conversion unit may represent the source coded form of the input data array 205. In some implementations, these bit streams are used as input to channel coding units 110a. The bit stream conversion unit 225 may include hardware and/or software for implementing coding schemes such as Huffman coding, variable length coding or other cryptographic coding schemes.

The partition unit 210, the transform unit 215, the quantization unit 220 and the bit stream conversion unit 225 may be implemented using any of a variety of particular hardware modules. For example any of these units may be implemented using one or more of a microprocessor, a microcontroller, and a digital signal processors (DSP). Implementations may include hardware circuits such as sample and hold circuits, adders, multipliers, shift registers, logic gates, transistors, flip flops, switches, capacitors, resistors, inductors, buses, cache memories, timing circuits and diodes. A variety of types of algorithms and/or software running on one or more programmed processors may be used in computing the transforms, quantization, partitioning or conversion to bit streams.

A corresponding decoder for implementing the source decoding 105b may include corresponding units to perform the inverse of different encoding steps. Some units, such as an inverse quantization unit to perform an inverse of the steps of the quantization unit 220, may only be able to perform an approximate inverse of any steps that are inherently lossy. Generally, the source coding at the encoder can be expressed as a composition of: (1) a first encoding function L that includes a mix of lossy and lossless operations (e.g., including the lossless transform application and the lossy quantization; and (2) a second encoding function N that includes only lossless (or "non-lossy") operations (e.g., including run-length coding and entropy coding). Thus, whenever the encoder performs a round-trip encoding followed by decoding to obtain a result that is the same as would be achieved at the decoder, it is only necessary to apply the first encoding function L and not the second encoding function N. For example, consider both functions being applied to the elements of a block X to yield an encoded set of coefficients Y, where Y=NLX (with each function being applied to the argument to its right, evaluating the entire expression from right to left). After the source decoding at the decoder, a decoded approximation of the original block, denoted by X', is recovered by applying the decoding functions $N^{-1}$ and $L^{-1}$, where $X'=L^{-1}N^{-1}NLX$. The second encoding function N is perfectly invertible by its corresponding decoding function $N^{-1}$ (i.e., $N^{-1}N=I$), where the identity function I represents no change to its argument. But, the first encoding function L is not perfectly invertible by its corresponding decoding function $L^{-1}$ (i.e., $L^{-1}L \neq I$), which is why X' is only an approximation of X such that $X' \neq X$.

It is understood that each function may be further broken down into any number of sub-steps, and not all of the sub-steps in the first encoding function are necessarily lossy. For example, if L is broken down into application of a transform T and application of quantization Q, which may be expressed as L=QT, it may only be the function Q that is lossy. There is a well-defined division between those sub-steps included in L and those sub-steps included in N. In particular, both lossless and lossy sub-steps may be included in L, but the last sub-step included in L is the last lossy sub-step applied by the encoder for processing a particular block. The remaining sub-steps (all lossless) are included in N. Furthermore, there may be additional lossy steps performed as part of encoding or decoding an entire frame or portion of a frame that are applied after multiple blocks have been encoded or decoded. For example, a lossy anti-blocking filter may be applied to an entire frame, affecting many blocks within the frame.

Part of the procedure for selecting a transform to be applied to a block will involve encoding a block using a particular transform and recovering decoded approximation that will result after decoding the coefficients using the inverse transform of that particular transform. To accomplish this, it is sufficient to simply apply the first encoding function and its decoding function $X'=L^{-1}LX$, since the second function would have been perfectly inverted anyway. In the examples below, this composition of this first encoding and decoding (also called "round-trip encoding-decoding"), expressed as $L^{-1}L$, is understood to include the transform T and its inverse transform $T^{-1}$ and any lossy operations that occur after the transform such as quantization Q and inverse quantization $Q^{-1}$.

Figure 3A:
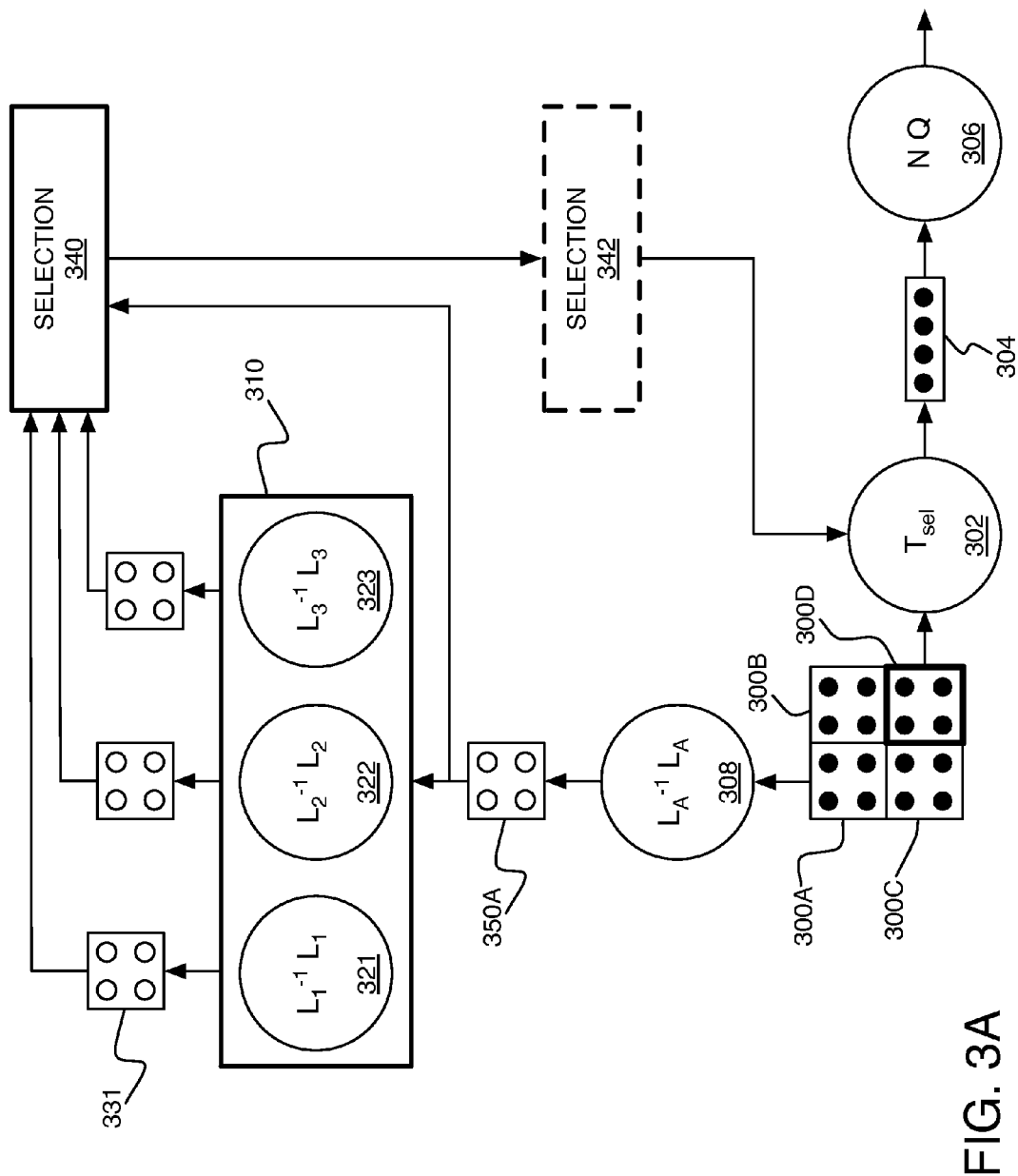
FIG. 3A is a block diagram of an exemplary encoding procedure.

FIG. 3A shows an example of a multiple-transform encoding procedure that may be used by the encoder to encode the blocks of an array, without the need to send side information to the decoder indicating the transform that was used for at least some of the blocks. A set of four neighboring blocks 300A-300D are shown for illustration purposes, but it is understood that any number of other blocks (not shown) may also exist in the entire array (i.e., frame or prediction residual) being encoded. Also, each block is shown with a 2×2 array of four pixels, but each block may include any number of pixels (e.g., an 8×8 array of 64 pixels). In this example, it is assumed that block 300D is being encoded, and three of its neighboring blocks 300A-300C (at the top, left, and upper-left) have previously been encoded. This example also shows an operation 302 of applying a selected transform $T_{sel}$ to the block 300D to generate transform coefficients 304 (four coefficients in this example), and the other steps involved in the source coding are represented by the compound operation 306 that applies quantization Q and second encoding function N.

The part of the encoding procedure that selects the transform $T_{sel}$ from multiple candidate transforms can be broken down into a two-part selection procedure, with the second part being optional. In the first part of the selection procedure, one or more blocks at predetermined locations in proximity to the bock being encoded are used as reference blocks to evaluate encoding performance of different candidate transforms. In this example, the first reference block to be used is block 300A (the neighbor to the upper-left of block 300D). Since an equivalent selection procedure will be performed by the decoder, which will not have access to the original blocks 300A-300D (only reconstructed approximations of them), the encoder generates the same decoded approximation of the block 300A that will be available to the decoder. So, the encoding procedure includes an operation 308 that applies the round-trip encoding-decoding $L_A^{-1}L_A$, which yields the decoded approximation block 350A. This encoding function $L_A$ for block 300A includes a transform $T_A$ (which may have been selected using an equivalent two-part selection procedure applied to some of the neighbors of block 300A).

The operation 308 may be performed in two steps. For example, if the block 300A has been previously encoded for inclusion in an encoded frame, then the quantized transform coefficients generated in that encoding process (by application of $L_A$) may have been stored for later analysis in the selection procedure for block 300D. Those saved quantized transform coefficients may then be retrieved and decoded (by application of $L_A^{-1}$) to yield block 350A. Alternatively, in some implementations, the full source round-trip encoding-decoding $L_A^{-1}N^{-1}NL_A$ may be applied to generate block 350A if, for example, it was the losslessly encoded bit sequence corresponding to block 300A that was stored for later analysis. However, the end result of the round-trip encoding-decoding $L_A^{-1}N^{-1}NL_A$ and the round-trip encoding-decoding $L_A^{-1}L_A$ are the same.

The first part of the selection procedure proceeds by applying each of a set of multiple candidate transforms $T_1$, $T_2$, and $T_3$ to the block 350A. (While this example includes three candidate transforms, any number of candidate transforms may be used.) In this example, the encoding performance that results from each candidate transform will be measured by application of a set of operations 312 that include separate round-trip encoding-decoding operations 321, 322, and 323 for each candidate transform $T_1$, $T_2$, and $T_3$, respectively. A first selection module 340 for the first part of the selection procedure compares each decoded approximation of the block 350A (which is itself an approximation of block 300A) to determine how closely they match each other. For example, for the first candidate transform $T_1$, the module 340 computes a difference between the decoded block 331 (generated using round trip encoding-decoding operation 321) and the block 350A (e.g., by subtracting respective pixels of one from the other) and computes a metric (e.g., a root mean square) that quantifies the size of that difference. The module 340 repeats this metric computation for each of the remaining candidate transforms (using operation 322 and operation 323), and selects the candidate transform with the smallest difference (according to the computed metric) as having the "best" performance for that block 350A.

The first part of the selection procedure may optionally be applied on any number of reference blocks in proximity to the block being encoded. In this example, the first part of the selection procedure is performed on each of the three reference blocks 300A, 300B, and 300C. However, the number of reference blocks used, and the locations of those reference blocks may be different, as long as the same reference blocks are used by the encoder and decoder. These different computations may be performed serially one after the other, or in parallel (e.g., in different processing modules, and/or different threads of a processor). In the second part of the selection procedure, performed only if there is more than one reference block, a second selection module 342 uses a predetermined rule for selecting the transform $T_{sel}$ to be used for encoding the block 300D.

Any of a variety of rules can be used for the predetermined rule, as long as the same rule is used by the encoder and decoder. For example, the best transform for each of the approximations of neighboring blocks 300A, 300B, and 300C may be denoted as $T'_A$, $T'_B$, and $T'_C$, respectively. Note that the transform $T'_A$ determined to be the best for the block 300A may be different from the transform $T_A$ that was actually used for encoding block 300A for transmission to the decoder. The predetermined rule may be to select the transform that had the best performance, relative to its respective reference block, (i.e., the smallest metric value) among all of the other "best" transforms. Alternatively, the predetermined rule may be to select the transform whose respective reference block is most similar to the block being decoded, according to some similarity metric. Thus, the selection module 342 may select a transform $T_{sel}$ that is the same as a transform $T'_A$ that yielded the best result for a decoded approximation 350A of neighboring block 300A, but is independent of the selection of the transform $T_A$ to encode that neighboring block 300A. While the transform $T_A$ will have some effect on the precise data values within the block 350A, the variation in performance of the different candidate transforms on the block 350A will depend much more on the gross features of the block 350A, and will be substantially insensitive to the specific transform $T_A$ used to reconstruct block 350A.

Figure 3B:
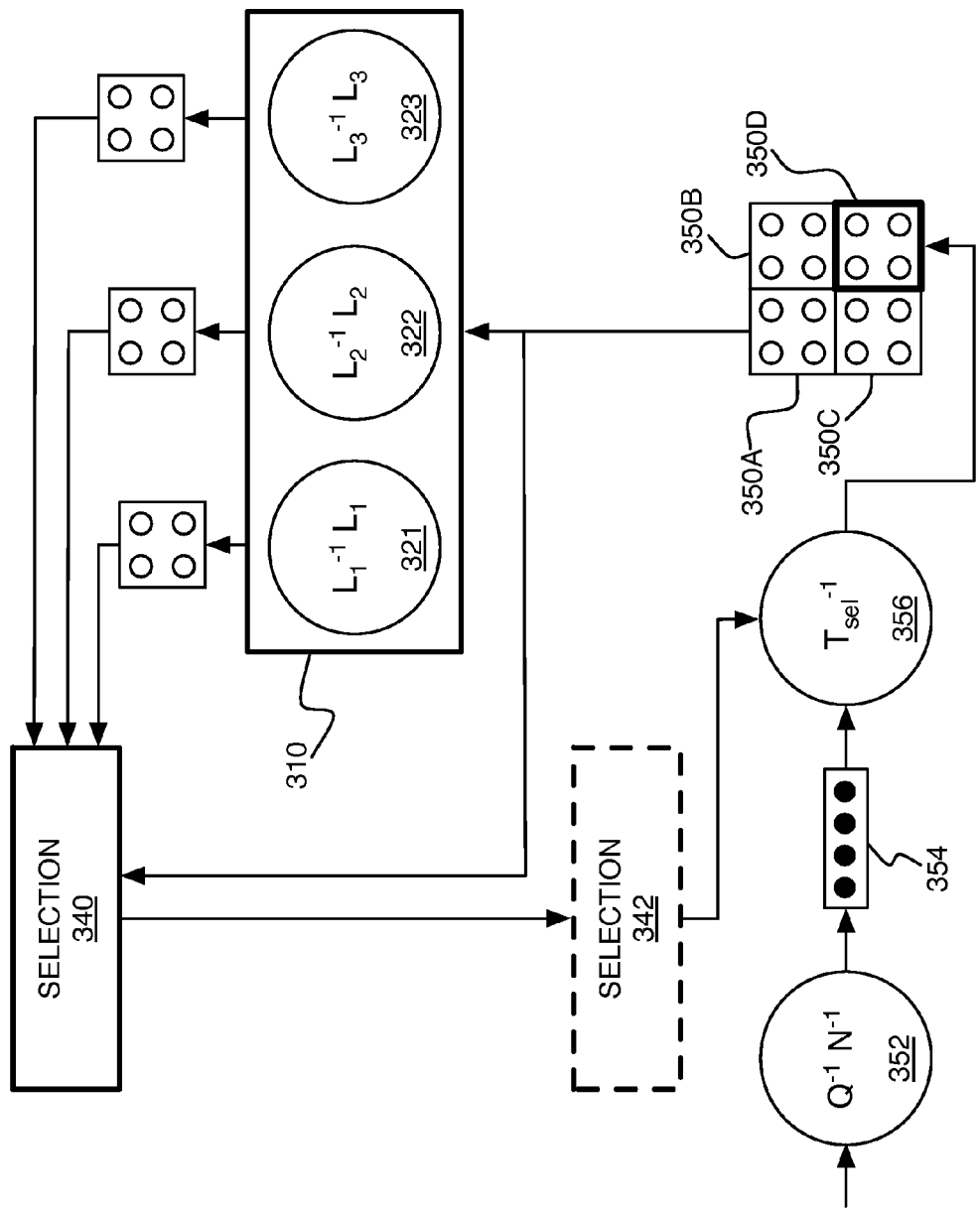
FIG. 3B is a block diagram of an exemplary decoding procedure.

FIG. 3B shows an example of a corresponding multiple-transform decoding procedure that may be used by the decoder to decode the encoded blocks of an array. In this example, a set of four neighboring blocks 350A-350D are decoded approximations of the four neighboring blocks 300A-300D at the encoder. The block 350D is being generated by decoding an incoming bit stream. The initial steps involved in the decoding are represented by a compound operation 352 that applies decoding function $N^{-1}$ followed by an inverse quantization function $Q^{-1}$ to generate transform coefficients 354. This example also shows an operation 356 of applying the inverse of the selected transform $T_{sel}^{-1}$ to the coefficients 354 to generate the block 350D, which is the decoded approximation of block 300D. Three of its neighboring blocks 350A-350C (at the top, left, and upper-left) have previously been decoded, and are available to the decoder. Thus, the same transform $T_{sel}$ is selected by the decoder, this time applied as an inverse transform, after following en equivalent two-part selection procedure to that described above for the encoder.

Figure 4A:
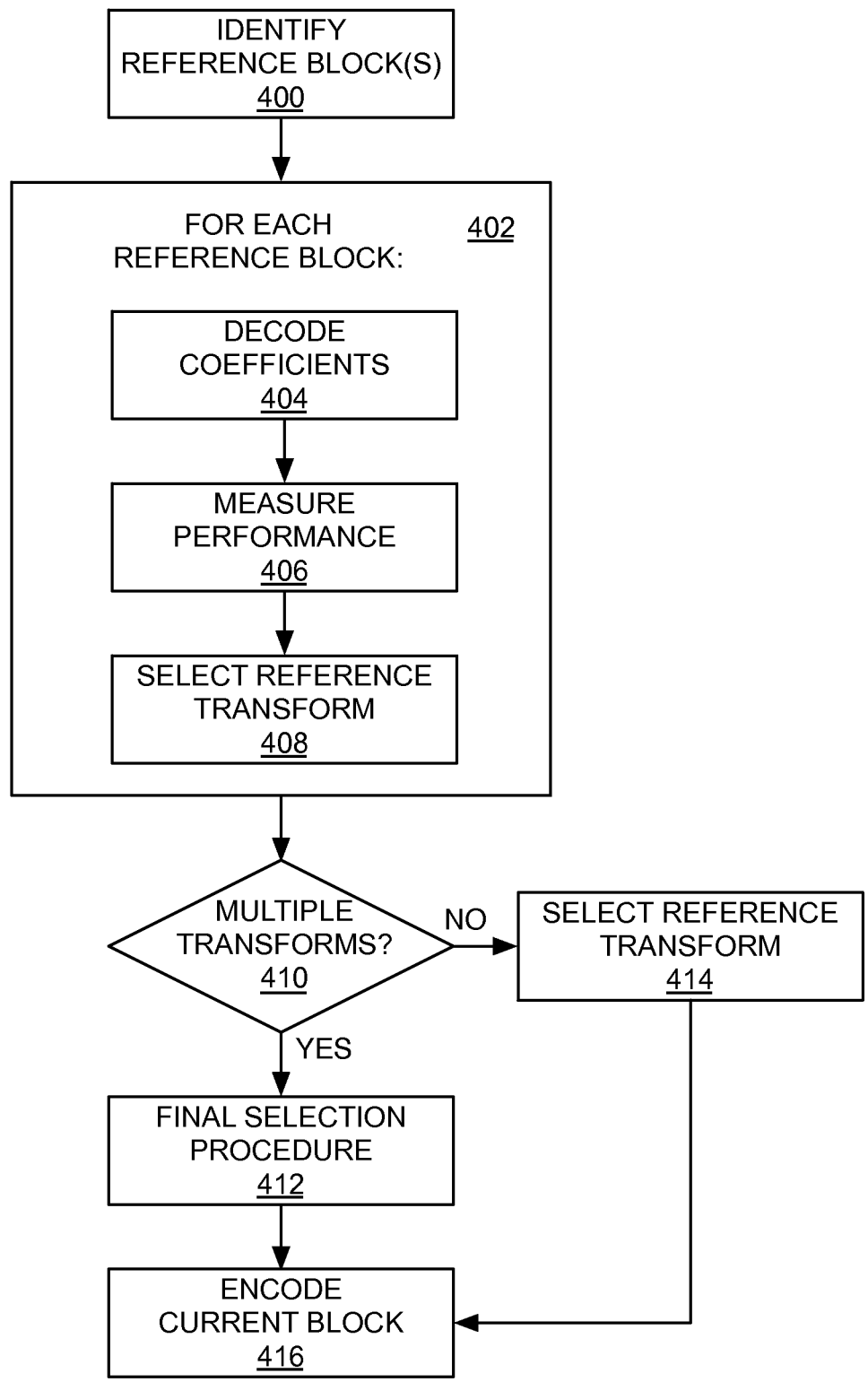
FIG. 4A is a flowchart of an exemplary encoding procedure.

FIG. 4A is a flowchart of an example of the encoding procedure for a particular current block of a group of blocks in a frame or prediction residual. The encoder identifies 400 a set of one or more reference blocks (in predetermined position(s) relative to the current block) to be used for selecting a transform from a group of candidate transforms. In this example, each reference block is assumed to have been previously encoded such that a stored set of quantized coefficients is available for reference block. For each reference block, the encoder performs a reference selection procedure 402 that includes decoding 404 the stored set of coefficients to generate a decoded approximation of the reference block, using the transform that was used to encode that reference block (applied as an inverse transform). The reference selection procedure 402 also includes: measuring 406 encoding performance for each candidate transform used to encode the decoded approximation of the reference block, and selecting 408 a reference transform from the multiple candidate transforms based at least in part on the measures of encoding performance. After the reference selection procedure 402 has been performed on each reference block, the encoder determines 410 if multiple reference transforms were selected (for respective reference blocks). If so, the encoder performs a final selection procedure 412 to determine which of the reference transforms to select for use in encoding the current block. If not, the encoder simply selects 414 the single reference transform as the selected transform. The encoder then encodes 416 the current block to generate a set of coefficients using the selected transform.

Figure 4B:
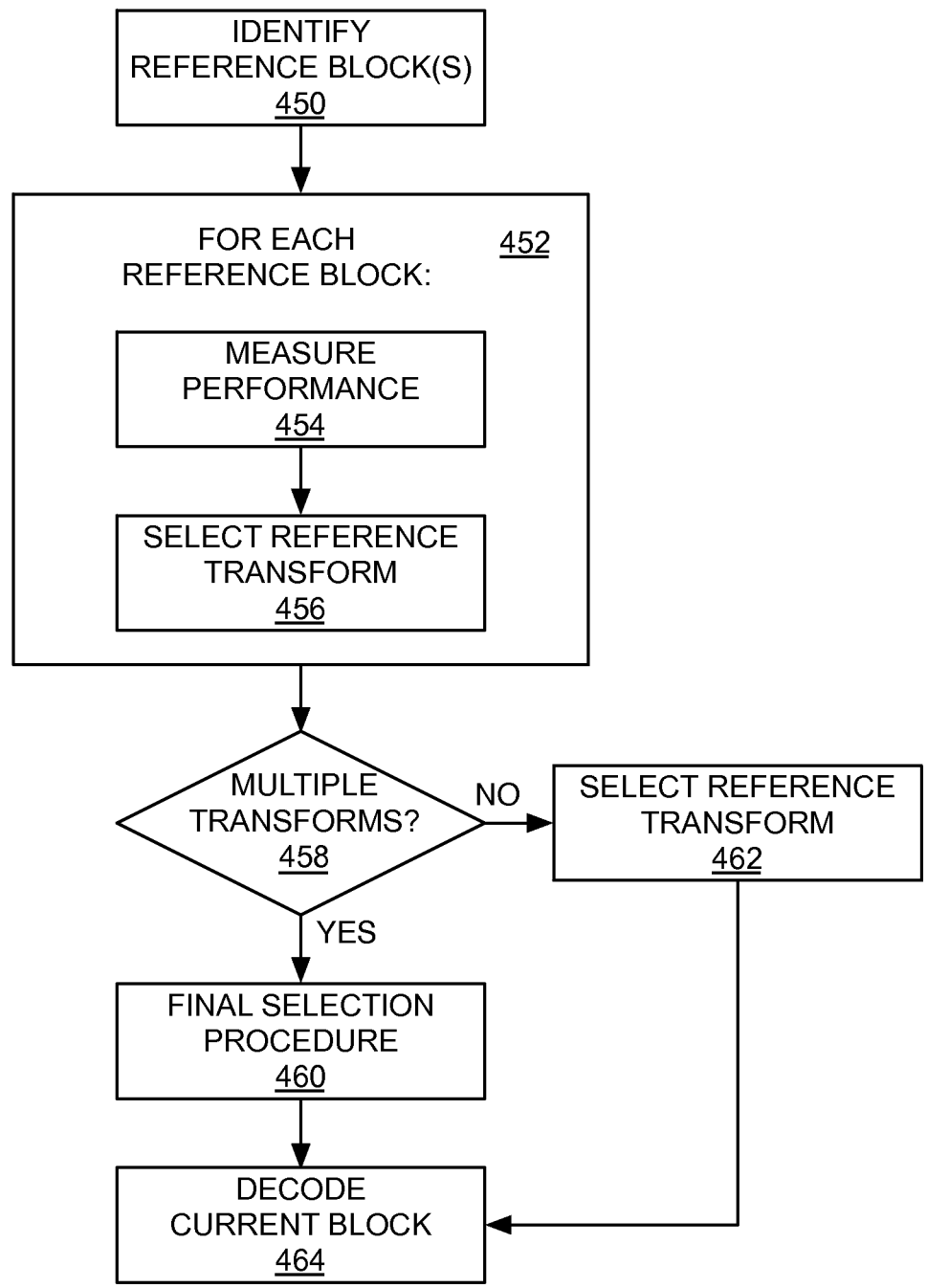
FIG. 4B is a flowchart of an exemplary decoding procedure.

FIG. 4B is a flowchart of an example of the decoding procedure for a particular current block of a group of blocks in a frame or prediction residual. The decoder identifies 450 a set of one or more reference blocks (in predetermined position(s) relative to the current block) to be used for selecting a transform from a group of candidate transforms. In this example, data is assumed to have been previously received with coefficients representing the reference blocks. The coefficients have been decoded to generate a decoded approximation of the reference block, using the transform that was used to encode that reference block (applied as an inverse transform). For each reference block, the decoder performs a reference selection procedure 452 that includes: measuring 454 encoding performance for each candidate transform used to encode the decoded approximation of the reference block, and selecting 456 a reference transform from the multiple candidate transforms based at least in part on the measures of encoding performance. After the reference selection procedure 452 has been performed on each reference block, the decoder determines 458 if multiple reference transforms were selected (for respective reference blocks). If so, the decoder performs a final selection procedure 460 to determine which of the reference transforms to select for use in decoding the current block. If not, the decoder simply selects 462 the single reference transform as the selected transform. The decoder then decodes 464 the coefficients for the current block to generate a decoded approximation of the current block using the selected transform.

The node 102 may be connected to or included within any of a variety of types of information sources. For example, the video or images may come from one or more sources such as a webcam, a video or still camera, a surveillance camera or a wireless handheld device such as a phone or a personal digital assistant (PDA). In some implementations, the source of information may be a file stored electronically in a server or any other computing device. In some implementations, the source of information may be a medical device that may transmit visual or other forms of data to a remote location. The source of information may also include, for example, any sensor, detector, recorder, or analyzer that can detect, derive, capture, store or record visual information such as video or images. In some implementations, the source of information may combine a plurality of sources including, but not limited to, the sources described above. The source of information may reside in any facility, location, or vehicle. For example, the source of information may be a security camera deployed in a building or campus. In another implementation, the source of information may be carried around by a user. In some implementations, the source of information may be an imager or detection devices on a satellite. In other implementations, the source of information may be deployed on a vehicle such as aircrafts, ships, or other manned or unmanned vehicles. The source of information may communicate with a node 102 that is connected to the network 104. In some implementations, the source of information may be a part of the node 102. In other implementations, the source of information may communicate with the node 102 via one or more networks and/or one or more intervening devices. Any hardware or software may be used to facilitate communication between the source of information and the node 102.

The node 102 may include devices capable of receiving and displaying or rendering images and/or video. For example, the node 102 could be a television or display device. The node 102 could be a desktop or laptop computer. The node could also be a wireless device such as a PDA or a mobile phone that is capable of receiving, storing or displaying images and video. In some implementations, the node 102 could be a storage device such as a server or memory capable of storing the information. Such a server or memory may be optionally connected to a device capable of retrieving and displaying visual information.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 104 may comprise a wireless link, such as an infrared channel or satellite band. The topology of the network 104 may be a bus, star, or ring network topology. The network may include any number of repeaters, appliances, devices, servers, storage media and queues.

The compression techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer, or delivered over a communication medium such as network to a receiving device where it is stored in a computer-readable storage medium for execution. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Other implementations are within the scope of the following claims.

What is claimed is:

1. A method of encoding data, the method comprising:
   encoding a first portion of an array of data to generate a first set of coefficients, using a first transform;
   decoding the first set of coefficients to generate a decoded approximation of the first portion, using the first transform;
   selecting a second transform from multiple candidate transforms based at least in part on a measure of encoding performance for each candidate transform used to encode the decoded approximation of the first portion; and
   encoding a second portion of the array of data in proximity to the first portion of the array of data to generate a second set of coefficients using the selected second transform;
   wherein a first candidate transform used to encode the decoded approximation of the first portion results in a particular set of coefficients, and the measure of encoding performance comprises a difference between the decoded approximation of the first portion and data decoded from the particular set of coefficients using the first candidate transform.

2. The method of claim 1, wherein the selection of the second transform is independent of a selection of the first transform used for encoding the first portion.

3. The method of claim 1, wherein encoding the first portion includes applying at least one lossy operation to generate the first set of coefficients.

4. The method of claim 3, wherein the lossy operation comprises quantization of transform coefficients resulting from the first transform to generate the first set of transform coefficients.

5. The method of claim 3, wherein decoding the first set of coefficients includes applying at least one approximate inverse of the lossy operation to generate the decoded approximation of the first portion.

6. The method of claim 5, wherein the approximate inverse operation comprises inverse quantization of the first set of transform coefficients.

7. The method of claim 1, wherein the first portion of the array of data comprises a residual block obtained by subtracting a block of pixel values of a first video frame from a corresponding block of pixel values of a second video frame.

8. The method of claim 1, further including transmitting encoded data including the encoded first portion of the array, the encoded second portion of the array, and side information identifying the first transform used for encoding the first portion of the array.

9. The method of claim 8, wherein the side information does not include any information explicitly identifying the second transform used for encoding the second portion of the array.

10. A non-transitory computer-readable medium storing a computer program for encoding data, the computer program comprising instructions for causing a computer system to:
    encode a first portion of an array of data to generate a first set of coefficients, using a first transform;
    decode the first set of coefficients to generate a decoded approximation of the first portion, using the first transform;
    select a second transform from multiple candidate transforms based at least in part on a measure of encoding performance for each candidate transform used to encode the decoded approximation of the first portion; and
    encode a second portion of the array of data in proximity to the first portion of the array of data to generate a second set of coefficients using the selected second transform;
    wherein a first candidate transform used to encode the decoded approximation of the first portion results in a particular set of coefficients, and the measure of encoding performance comprises a difference between the decoded approximation of the first portion and data decoded from the particular set of coefficients using the first candidate transform.

11. An apparatus for encoding data, the apparatus comprising:
    transmitting circuitry configured to transmit data including coefficients representing portions of an array of data, and
    at least one processor coupled to the transmitting circuitry, configured to:
        encode a first portion of the array of data to generate a first set of coefficients, using a first transform;
        decode the first set of coefficients to generate a decoded approximation of the first portion, using the first transform;
        select a second transform from multiple candidate transforms based at least in part on a measure of encoding performance for each candidate transform used to encode the decoded approximation of the first portion; and
        encode a second portion of the array of data in proximity to the first portion of the array of data to generate a second set of coefficients using the selected second transform;
        wherein a first candidate transform used to encode the decoded approximation of the first portion results in a particular set of coefficients, and the measure of encoding performance comprises a difference between the decoded approximation of the first portion and data decoded from the particular set of coefficients using the first candidate transform.

12. A method of decoding data, the method comprising:
    receiving data including coefficients representing portions of an array of data;
    decoding a first set of coefficients to generate a decoded approximation of a first portion of the array of data, using a first transform;
    selecting a second transform from multiple candidate transforms based at least in part on a measure of encoding performance for each candidate transform used to encode the decoded approximation of the first portion; and decoding a second set of coefficients to generate a decoded approximation of a second portion of the array of data in proximity to the first portion of the array of data, using the selected second transform;
wherein a first candidate transform used to encode the decoded approximation of the first portion results in a particular set of coefficients, and the measure of encoding performance comprises a difference between the decoded approximation of the first portion and data decoded from the particular set of coefficients using the first candidate transform.

13. The method of claim 12, wherein the selection of the second transform is independent of a selection of the first transform used for encoding the first portion.

14. The method of claim 12, wherein encoding the first portion included applying at least one lossy operation to generate the first set of coefficients.

15. The method of claim 14, wherein the lossy operation comprised quantization of transform coefficients resulting from the first transform to generate the first set of transform coefficients.

16. The method of claim 14, wherein decoding the first set of coefficients includes applying at least one approximate inverse of a lossy operation to generate the decoded approximation of the first portion.

17. The method of claim 16, wherein the approximate inverse operation comprises inverse quantization of the first set of transform coefficients.

18. The method of claim 12, wherein the first portion of the array of data comprises a residual block obtained by subtracting a block of pixel values of a first video frame from a corresponding block of pixel values of a second video frame.

19. The method of claim 12, further including receiving encoded data including the first set of coefficients, the second set of coefficients, and side information identifying the first transform used for encoding the first portion of the array.

20. The method of claim 19, wherein the side information does not include any information explicitly identifying the second transform used for decoding the second set of coefficients.

21. A non-transitory computer-readable medium storing a computer program for decoding data, the computer program comprising instructions for causing a computer system to:
receive data including coefficients representing portions of an array of data;
decode a first set of coefficients to generate a decoded approximation of a first portion of the array of data, using a first transform;
select a second transform from multiple candidate transforms based at least in part on a measure of encoding performance for each candidate transform used to encode the decoded approximation of the first portion; and
decode a second set of coefficients to generate a decoded approximation of a second portion of the array of data in proximity to the first portion of the array of data, using the selected second transform;
wherein a first candidate transform used to encode the decoded approximation of the first portion results in a particular set of coefficients, and the measure of encoding performance comprises a difference between the decoded approximation of the first portion and data decoded from the particular set of coefficients using the first candidate transform.

22. An apparatus for decoding data, the apparatus comprising:
receiving circuitry configured to receive data including coefficients representing portions of an array of data; and
at least one processor coupled to the receiving circuitry, configured to:
decode a first set of coefficients to generate a decoded approximation of a first portion of the array of data, using a first transform;
select a second transform from multiple candidate transforms based at least in part on a measure of encoding performance for each candidate transform used to encode the decoded approximation of the first portion; and
decode a second set of coefficients to generate a decoded approximation of a second portion of the array of data in proximity to the first portion of the array of data, using the selected second transform;
wherein a first candidate transform used to encode the decoded approximation of the first portion results in a particular set of coefficients, and the measure of encoding performance comprises a difference between the decoded approximation of the first portion and data decoded from the particular set of coefficients using the first candidate transform.

23. A system, comprising:
at least one transmitting device configured to:
encode a first portion of an array of data to generate a first set of coefficients using a first transform;
decode the first set of coefficients to generate a decoded approximation of the first portion, using the first transform;
selecting a second transform from multiple candidate transforms based at least in part on a measure of encoding performance for each candidate transform used to encode the decoded approximation of the first portion; and
encoding a second portion of the array of data in proximity to the first portion of the array of data to generate a second set of coefficients using the selected second transform; and
at least one receiving device configured to:
receive data including coefficients representing portions of the array of data, the received data including the first set and second sets of coefficients generated by the transmitting device;
decode the first set of coefficients to generate the decoded approximation of the first portion, using a first transform;
select the second transform from the multiple candidate transforms based at least in part on a measure of encoding performance for each candidate transform used to encode the decoded approximation of the first portion; and
decode the second set of coefficients to generate the decoded approximation of the second portion, using the selected second transform;
wherein, for the transmitting device and the receiving device, a first candidate transform used to encode the decoded approximation of the first portion results in a particular set of coefficients, and the measure of encoding performance comprises a difference between the decoded approximation of the first portion and data decoded from the particular set of coefficients using the first candidate transform.

* * * * *